US010637064B2

(12) United States Patent
Ryu et al.

(10) Patent No.: US 10,637,064 B2
(45) Date of Patent: Apr. 28, 2020

(54) METHOD FOR MANUFACTURING CONDUCTOR, CONDUCTOR MANUFACTURED THEREBY AND LITHIUM SECONDARY BATTERY INCLUDING THE SAME (71) Applicant: LG Chem, Ltd., Seoul (KR)

(72) Inventors: Ji Hoon Ryu, Daejeon (KR); Dong Myung Kim, Daejeon (KR); Ki Tae Kim, Daejeon (KR); Rae Hwan Jo, Daejeon (KR)

(73) Assignee: LG Chem, Ltd. (KR)

( * ) Notice: Subject to any disclaimer, the term of this patent is extended or adjusted under 35 U.S.C. 154(b) by 377 days.

(21) Appl. No.: 15/503,251

(22) PCT Filed: Oct. 22, 2015

(86) PCT No.: PCT/KR2015/011235
§ 371 (c)(1),
(2) Date: Feb. 10, 2017

(87) PCT Pub. No.: WO2016/072649
PCT Pub. Date: May 12, 2016

(65) Prior Publication Data
US 2017/0237073 A1 Aug. 17, 2017

(30) Foreign Application Priority Data

Nov. 3, 2014 (KR) .................. 10-2014-0151273

(51) Int. Cl.
*H01M 4/62* (2006.01)
*C01B 32/05* (2017.01)
*B01J 19/12* (2006.01)
*H01M 4/505* (2010.01)
*H01M 4/525* (2010.01)
*H01M 4/587* (2010.01)
*H01M 10/0525* (2010.01)

(52) U.S. Cl.
CPC .......... *H01M 4/625* (2013.01); *B01J 19/126* (2013.01); *C01B 32/05* (2017.08); *H01M 4/505* (2013.01); *H01M 4/525* (2013.01); *H01M 4/587* (2013.01); *H01M 4/623* (2013.01); *H01M 10/0525* (2013.01); *B01J 2219/0879* (2013.01); *B01J 2219/1281* (2013.01); *C01P 2006/40* (2013.01); *H01M 2220/20* (2013.01); *Y02E 60/122* (2013.01); *Y02P 70/54* (2015.11); *Y02T 10/7011* (2013.01)

(58) Field of Classification Search
CPC ...... H01M 4/625; H01M 4/623; H01M 4/663; Y02P 70/54
See application file for complete search history.

(56) References Cited

U.S. PATENT DOCUMENTS

| 2004/0191157 | A1 | 9/2004 | Harutyunyan et al. |
| 2009/0200517 | A1 | 8/2009 | El Bounia |
| 2010/0012899 | A1 | 1/2010 | Kim et al. |
| 2010/0055441 | A1* | 3/2010 | Marcinek .......... H01J 37/32192 428/312.2 |
| 2011/0217229 | A1 | 9/2011 | Inomata et al. |
| 2013/0248757 | A1 | 9/2013 | Shim et al. |
| 2014/0177136 | A1 | 6/2014 | Kim et al. |

FOREIGN PATENT DOCUMENTS

| CN | 102165022 A | 8/2011 |
| CN | 101973545 B | 9/2012 |
| EP | 2641867 A1 | 9/2013 |
| JP | S62188167 A | 8/1987 |
| JP | 2000327316 A | 11/2000 |
| JP | 2006143573 A | 6/2006 |
| JP | 2006521998 A | 9/2006 |
| JP | 2009533518 A | 9/2009 |
| JP | 2011090794 A | 5/2011 |
| JP | 2012062222 A | 3/2012 |
| JP | 2013201120 A | 10/2013 |
| KR | 20100009061 A | 1/2010 |
| KR | 100994181 B1 | 11/2010 |
| KR | 20110066920 A | 6/2011 |

(Continued)

OTHER PUBLICATIONS

European Search Report for Application No. 15857341.0 dated Jul. 14, 2017, 4 pages.
Mackenzie K et al: "A review of carbon nanotube purification by microwave assisted acid digestion", Separation and Purification Technology, Elsevier Science, Amsterdam, NL, vol. 66, No. 2, Apr. 20, 2009, pp. 209-222.
International Search Report from PCT/KR2015/011235, dated Feb. 17, 2016.
Ko, Fu-Hsiang, et al., "Purification of multi-walled carbon nanotubes through microwave heating of nitric acid in a closed vesel." Carbon, , vol. 43, 2005, pp. 727-733.
Pelech, Iwona, et al., "Removal of metal particles from carbon nanotubes using conventional and microwave methods." Separation and Purification Technology, vol. 136, 2014, pp. 105-110.

(Continued)

*Primary Examiner* — Ladan Mohaddes
(74) *Attorney, Agent, or Firm* — Lerner, David, Littenberg, Krumholz & Mentlik, LLP (57) ABSTRACT The present invention relates to a method for manufacturing a conductor, and a lithium secondary battery including a conductor manufactured using the manufacturing method, and the method for manufacturing a conductor includes removing metal impurities in a conductor by irradiating microwave on the conductor including the metal impurities and converting the metal impurities into metal oxides.
A conductor manufactured using the manufacturing method converts metal impurities included in the conductor to metal oxides that are inactive at a battery operating voltage and not eluted in an electrolyte liquid, and therefore, is capable of enhancing battery performance properties, particularly, capacity and lifespan properties without concern of metal impurity elution and a defect occurrence under a low pressure caused therefrom.

17 Claims, 6 Drawing Sheets

(56) References Cited

FOREIGN PATENT DOCUMENTS

| KR | 20140077519 A  | 6/2014 |
|----|----------------|--------|
| WO | 2010035871 A1  | 4/2010 |
| WO | 2014132809 A1  | 9/2014 |

OTHER PUBLICATIONS

Tsai, Peir-An, et al., "Purification and Functionalization of Single-Walled Carbon Nanotubes through Different Treatment Procedures." Journal of Nanomaterials, vol. 2013, Article ID 937697, pp. 1-9.
Dementev, Nikolay, et al., "Purification of carbon nanotubes by dynamic oxidation in air." Journal of Materials Chemistry, vol. 19, 2009, pp. 7904-7908.
Chinese Search Report for Application No. CN201580046476.1 dated Jun. 16, 2019, pp. 1-2.

\* cited by examiner

METHOD FOR MANUFACTURING CONDUCTOR, CONDUCTOR MANUFACTURED THEREBY AND LITHIUM SECONDARY BATTERY INCLUDING THE SAME

CROSS-REFERENCE TO RELATED APPLICATION

This application is a national phase entry under 35 U.S.C. § 371 of International Application No. PCT/KR2015/011235, filed Oct. 22, 2015, which claims priority to Korean Patent Application No. 10-2014-0151273, filed Nov. 3, 2014, the disclosures of which are incorporated herein by reference.

FIELD OF THE INVENTION

The present invention relates to a method for manufacturing a conductor capable of preventing an occurrence of defects under a low voltage in a battery caused by metal impurities, a conductor manufactured thereby and a lithium secondary battery including the same.

DESCRIPTION OF THE RELATED ART

With a recent explosion of demands for mobile electronic devices, demands for secondary batteries have also increased. In addition, as electronic devices become more high-functional and smaller, secondary batteries also have been required to be smaller and modified to various shapes while being high-functional. For example, in the case of laptop computers, secondary battery sizes greatly affect laptop computer thicknesses, and therefore, attempts for high capacity and high performance, and structural changes in battery shapes have been made in order to reduce thicknesses of laptop computers.

A secondary battery generally has a structure in which a lithium electrolyte is impregnated in an electrode assembly formed with a positive electrode including a lithium transition metal oxide as an electrode active material, a negative electrode including a carbon-based active material, and a separator. The positive electrode is manufactured by coating a positive electrode mixture including a lithium transition metal oxide on aluminum foil, and the negative electrode is manufactured by coating a negative electrode mixture including a carbon-based active material on copper foil.

In addition, a conductor is generally added in the positive electrode and the negative electrode for the purpose of enhancing electric conductivity of the active material. Such a conductor includes graphite such as natural graphite or artificial graphite, carbon-based materials such as carbon black, acetylene black, Ketjen black, channel black, furnace black, lamp black and thermal black, and in some cases, conductive fiber such as carbon fiber and metal fiber, and the like, are used.

Particularly, a lifespan property of a secondary battery declines as its constituents are degraded due to various reasons, and one of the main reasons is due to the mixing of metal impurities included in a conductor into the battery. Specifically, metal impurities such as iron (Fe) included in a conductor react under approximately 3.0 V to 4.5 V, an operating voltage range of a lithium secondary battery, and are dissolved in an electrolyte liquid, and the dissolved metal impurities are re-precipitated in a metal form in a negative electrode. The metals precipitated as described above penetrate a separator and shorted with a positive electrode causing low voltage defects, which leads to decline in a capacity property and a lifespan property of a secondary battery, and disrupts the battery from fulfilling the role as a battery. Such low voltage defects are distinguishable only in a finished product stage and therefore, manufacturing loss is severe.

Accordingly, researches preventing the mixing of impurities, particularly, metal impurities, in manufacturing a secondary battery have been continuously required.

DISCLOSURE OF THE INVENTION

Technical Problem

In view of the above, one technological aspect of the present invention is to provide a method for manufacturing a conductor capable of preventing elution of metal impurities and thereby preventing an occurrence of defects under a low pressure in a battery, and enhancing battery performance properties, particularly, capacity and lifespan properties, and a conductor manufactured using the method.

Another technological aspect of the present invention is to provide an electrode, a lithium secondary battery, a battery module and a battery pack including a conductor manufactured using the manufacturing method described above.

However, technological aspects to accomplish in the present invention are not limited to the aspects described above, and other aspects not described herein will be clearly understood by those skilled in the art from the following descriptions.

Technical Solution

One embodiment of the present invention provides a method for manufacturing a conductor including removing metal impurities in a conductor by irradiating microwave on the conductor including the metal impurities and converting the metal impurities into metal oxides.

Another embodiment of the present invention provides a conductor manufactured using the method described above.

Still another embodiment of the present invention provides an electrode for a lithium secondary battery including the conductor.

Moreover, another embodiment of the present invention provides a lithium secondary battery including a positive electrode, a negative electrode, a separator provided between the positive electrode and the negative electrode, and a non-aqueous electrolyte, wherein at least one of the positive electrode and the negative electrode includes the conductor.

Furthermore, another embodiment of the present invention provides a battery module and a battery pack including the lithium secondary battery as a unit cell.

Other specifics of the embodiments of the present invention are described below in the mode for carrying out the invention.

Advantageous Effects

A method for manufacturing a conductor according to the present invention selectively converts only metal impurities included in a conductor to metal oxides that are inactive at an operating voltage of a secondary battery and not eluted in an electrolyte liquid by microwave treatment without changing the conductor, and therefore, is capable of preventing elution of metal impurities in the conductor in a battery operating voltage range and thereby preventing an occurrence of defects under a low pressure, and enhancing battery performance properties, particularly, capacity and lifespan properties.

In addition, the method for manufacturing a conductor is capable of being used regardless of battery types including a polymer, a square-type or a cylinder-type, and in the manufacturing method, the process of removing metal impurities by microwave treatment readily controls a reaction condition compared to thermal baking or a chemical reaction, and exhibits excellent processibility due to a short reaction time.

DESCRIPTION OF DRAWINGS

The drawings accompanied in the present specification illustrate preferred embodiments of the present invention, and performs a role of further illuminating technological ideas of the present invention together with the contents of the invention described above, and accordingly, the present invention is not to be interpreted limiting to those described in the drawings.

MODE FOR CARRYING OUT THE INVENTION

Hereinafter, the present invention will be described in more detail in order to illuminate the present invention.

Terms or words used in the present specification and the claims are not to be interpreted limitedly to common or dictionary definitions, and shall be interpreted as meanings and concepts corresponding to technological ideas of the present invention based on a principle in which the inventors may suitably define the concepts of terms in order to describe the invention in the best possible way.

The present invention provides a conductor capable of preventing elution of metal impurities in a negative electrode and thereby preventing an occurrence of low pressure defects in a battery, and enhancing battery performance properties, particularly, capacity and lifespan properties, by converting metal impurities in the conductor to stable metal oxides that are inactive in a battery operating voltage range and are not soluble in an electrolyte liquid through heat treating the conductor including the metal impurities by microwave irradiation.

In other words, the method for manufacturing a conductor according to one embodiment of the present invention includes removing metal impurities in a conductor by converting the metal impurities to metal oxides, that is, oxides of the metal impurities, by irradiating microwave on the conductor including the metal impurities.

In the method for manufacturing a conductor, the conductor is used for providing conductivity to an electrode of a secondary battery, and is not particularly limited as long as it has electronic conductivity without inducing chemical changes in the corresponding secondary battery. Specific examples thereof may include carbon-based materials such as natural graphite, artificial graphite, graphitized carbon fiber, amorphous carbon, corks, carbon black, acetylene black, Ketjen black, channel black, furnace black, lamp black, thermal black, denca black, super P, super C, carbon fiber, carbon nanotubes or activated carbon; needle-shaped or branch-shaped conductive whiskers such as a zinc oxide whisker, a calcium carbonate whisker, a titanium dioxide whisker, a silicon oxide whisker, a silicon carbide whisker, an aluminum borate whisker, a magnesium borate whisker, a potassium titanate whisker, a silicon nitride whisker, a silicon carbide whisker or an alumina whisker; conductive metal oxides such as titanium oxide; or conductive polymers such as polyphenylene derivatives, and the like, and these may be used either alone as one type, or as a mixture of two or more types.

More specifically, the conductor may be the carbon-based material, and even more specifically, includes any one, two or more selected from the group consisting of carbon black, acetylene black, Ketjen black, channel black, furnace black, lamp black, thermal black, denca black, super P, super C, carbon fiber, carbon nanotubes and activated carbon to have stability in a conductor manufacturing process and obtain more superior improving effect by the use of the conductor in a battery.

In addition, the conductor inevitably includes metal impurities produced in the manufacturing process or mixed into the process. The metal impurities may be metals, alloys of the metals or sulfides including these, and may include any one, two or more of these. More specifically, the metal may be any one selected from the group consisting of iron (Fe), copper (Cu), zinc (Zn), calcium (Ca), titanium (Ti) and chromium (Cr), and the alloy may include two or more metal elements selected from among these metals. More specifically, the metal impurities may be iron (Fe), an iron sulfide (FeS), copper (Cu), zinc (Zn), calcium (Ca), titanium (Ti), chromium (Cr) or the like, and one type alone or a mixture of two or more types of these may be included as metal impurities in the conductor.

Metal impurity content in the conductor may vary depending on a condition in the manufacturing process, and therefore, is not particularly limited. However, the metal impurities may be included in an amount of 1% by weight or less, more specifically 0.01% by weight to 1% by weight with respect to the total conductor weight considering conductivity and the like required for lithium impurities to be used in a common secondary battery.

The metal impurities are thermally oxidized by microwave treatment thereafter, and are converted to oxides of the metal impurities. The metal oxides converted from the metal impurities may be specifically an iron oxide, an iron sulfide oxide, a copper oxide, a zinc oxide, a calcium oxide, a titanium oxide or a chromium oxide, and one type alone or a mixture of two or more types of these may be included in the finally manufactured conductor. More specifically, the metal oxide may be FeO, $Fe_3O_4$, $Fe_2O_3$, an iron sulfide oxide, CuO, CaO, $TiO_2$, ZnO or the like, and more specifically $Fe_2O_3$ or $Fe_3O_4$.

In addition, the conversion from the metal impurities to the metal oxides may be affected by a microwave output amount, a microwave irradiation time, and a heating temperature from the microwave irradiation in the microwave treatment.

Specifically, in the method for manufacturing a conductor according to one embodiment of the present invention, microwave treatment for the conductor including metal impurities may be carried out by irradiating microwave having a frequency of 1 kHz to 50 kHz and an output of 400 W to 2000 W for 20 seconds or less. When irradiating microwave under the condition described above, conversion efficiency of metal impurities included in the conductor to metal oxides is high. However, when the microwave frequency is less than 1 kHz or the output amount is less than 400 W, a heating effect is insufficient leading to low conversion efficiency to metal oxides, and when the frequency is greater than 50 kHz, and the output amount is greater than 2000 W, structural changes in the conductor or side reactions may occur. In addition, when irradiating microwave with the above-mentioned condition for 20 seconds or longer, the conductor may react and there is a danger of explosion.

When more specifically considering the significance of conversion efficiency of metal impurities in the conductor to metal oxides, the microwave treatment may be carried out by irradiating microwave having a frequency of 2 kHz to 20 kHz and an output of 400 W to 1500 W for 10 seconds to 20 seconds.

By heating the conductor including metal impurities at 350° C. to 600° C. by microwave irradiation with the above-mentioned condition, the metal impurities in the conductor may be thermally oxidized. When the heating temperature by microwave irradiation is lower than 350° C., the metal impurities are not oxidized and not converted to metal oxides, and conversion to metal oxides may take too long. Meanwhile, when the heating temperature is higher than 600° C., the conductor starts to be oxidized, and therefore, structure of the conductor may change or by-products may be produced.

Specifically, super P including impurities of metals such as Fe, FeS, Cu, or Zn may start to be oxidized at approximately 600° C. However, the metal impurities, for example, Fe and Cu, start to be oxidized at approximately 300° C., and FeS and Zn at approximately 400° C., and accordingly, the metal impurities may be completely oxidized at a temperature of approximately 600° C., an oxidation temperature of super P, or lower.

In addition, the microwave irradiation is preferably carried out under an oxidation atmosphere such as air or oxygen.

In the present invention, forms of the conductor, the metal impurities or the metal oxides, an oxidation temperature, and content of the metal impurities or the metal oxides may be analyzed or identified using magnetic properties, or using a method including one or more thermal analysis methods such as an X-ray diffraction method (XRD), differential thermal analysis (DTA), differential scanning calorimetry (DSC), modulated differential scanning calorimetry (MDSC), a thermogravimetric analysis method (TGA), thermogravimetric-infrared (TG-IR) analysis and melting point measurement.

Specifically, oxidized timing of the conductor and each metal impurity may be analyzed by, for example, thermogravimetric analysis (TGA), and oxidized forms of the conductor, the metal impurities and the metal oxides produced after baking may be analyzed through an X-ray diffraction method (XRD).

Metal impurities included in an amount of approximately 0.01% by weight to 1% by weight with respect to the total conductor weight prior to microwave irradiation may be 100% converted to metal oxides, however, some of the metal impurities may be converted to metal oxides with the microwave output amount, the microwave irradiation time, and the heating temperature by microwave irradiation. For example, the converted metal oxides may be in an amount of 0.5% by weight to 100% by weight, preferably in 30% by weight to 100% by weight and more preferably in 60% by weight to 100% by weight with respect to the total weight of the metal impurities. Herein, the metal oxides are inactive under 3 V to 4.5 V, an operating voltage of a battery, and therefore, as the amount of the metal impurities converting to metal oxides increases, it is effective for defect improvement and performance properties of a secondary battery.

The method for manufacturing a conductor using microwave as described above quickly and readily oxidizes only metal impurities included in the conductor to metal oxides in a highly efficient way without changing the conductor using only oxygen in the air without using a separate oxidizing agent. In addition, a reaction condition may be readily controlled compared to methods for removing metal impurities in a conductor by thermal baking or chemical treatment.

Another embodiment of the present invention provides a conductor manufactured using the above-mentioned manufacturing method.

Specifically, the conductor may include oxides of the metal impurities, and may selectively further include metal impurities that are not converted to metal oxides in the manufacturing process.

In the conductor manufactured using the above-mentioned manufacturing method, smaller amounts of the metal impurities mean an increase in the amount to be converted to metal oxides. Specifically, in the conductor according to one embodiment of the present invention, a content ratio of the metal oxides to the metal impurities is 0:100 to 0.5:99.5 in a weight ratio, more specifically, 0:100 to 0.3:99.7 in a weight ratio, and even more specifically, 0:100 to 0.2:99.8 in a weight ratio. Herein, specific types of the metal impurities and the metal oxides in the conductor are the same as those described above, and a content ratio of the metal oxides to the metal impurities included in the conductor may be measured using, for example, an X-ray diffraction method (XRD), and specifically, a content ratio of the metal impurities/metal oxide may be measured considering main peak strength of the metal impurities, and relative peak strength of conductor peaks produced after baking at the main peaks.

In addition, an amount of the metal oxides included in the conductor may vary depending on the types of the conductor, the content of the metal impurities and a microwave treatment condition, and the metal oxides may be included in a few ppm, and more specifically, in 0.01% by weight to 1% by weight.

In the conductor according to one embodiment of the present invention, metal impurities included in the conductor during the manufacturing process are converted to metal oxides that are inactive in a battery operating voltage range, and not soluble in an electrolyte liquid, and consequently, there is no concern of metal impurity elution in the conductor in a battery operating voltage range and a low voltage defect occurrence caused therefrom, and performance properties of a battery, particularly, capacity and lifespan properties may be further enhanced.

Another embodiment of the present invention provides an electrode for a lithium secondary battery including the conductor manufactured using the above-mentioned manufacturing process.

The electrode may be a positive electrode or a negative electrode, and may be manufactured using common methods for manufacturing an electrode forming an active material layer including a positive electrode active material or a negative electrode active material on a positive electrode or negative electrode collector, except that the above-mentioned conductor is used.

Specifically, when the electrode is a negative electrode, the negative electrode may be manufactured by applying a negative electrode mixture including a binder and the conductor together with a negative electrode active material on a negative electrode collector, and then drying the result.

Herein, the negative electrode collector is not particularly limited as long as it has high conductivity without inducing chemical changes in a battery, and examples thereof may include copper, stainless steel, aluminum, nickel, titanium, baked carbon, or copper or stainless steel of which surface is treated with carbon, nickel, titanium, silver or the like, aluminum-cadmium alloys, and the like. Such a negative electrode collector may have various forms, and specifically, may have forms such as films, sheets, foil, nets, porous materials, foams and non-woven fabrics may be used.

In addition, the negative electrode collector preferably has a thickness of 3 μm to 500 μm, and may form a fine unevenness or pattern on the collector surface so as to strengthen adhesion of the negative electrode active material.

In addition, the negative electrode mixture may be prepared by dissolving and dispersing a negative electrode active material, a binder, and the conductor in a solvent.

Herein, the conductor may be the same as that described above, and may be included in an amount of 1% by weight to 15% by weight with respect to the total weight of the negative electrode mixture. When the amount of the conductor is less than 1% by weight, the conductor amount is too small, which may cause battery performance decline due to an inner resistance increase of an electrode, and when the conductor amount is greater than 15% by weight, the amount of the binder also needs to be increased as the amount of the conductor increases, which may cause a problem such as battery capacity decline due to an electrode active material decrease.

In addition, the negative electrode active material may use a compound capable of reversible intercalation and deintercalation of lithium. Specific examples thereof may include carbon materials such as artificial graphite, natural graphite, graphite carbon fiber or amorphous carbon; metal compounds capable of alloying with lithium such as Si, Al, Sn, Pb, Zn, Bi, In, Mg, Ga, Cd, Si alloys, Sn alloys or Al alloys; or complexes including the metal compound and the carbon compound, and the like, and one type alone, or a mixture of two or more types of these may be used. In addition, a metal lithium thin film may be used as the negative electrode active material.

Furthermore, the binder performs a role of attaching negative electrode active materials to each other, and enhancing adhesion between the negative electrode active material and the negative electrode collector. Specific example thereof may include polyvinylidene fluoride (PVDF), polyvinyl alcohol, starch, hydroxypropylcellulose, regenerated cellulose, polyvinylpyrrolidone, tetrafluoroethylene, polyethylene, polypropylene, ethylene-propylene-diene monomer rubber (EPDM), sulfonated-EPDM rubber, styrene-butadiene rubber (SBR), fluorine rubber or various copolymers thereof, and these may be used either alone as one type, or as a mixture of two or more types.

Among these, the binder may be an aqueous binder considering the significance of improving effects, and more specifically, the binder may be styrene-butadiene rubber considering the significance of improving effects, adhesion ability of the binder itself and a high-temperature drying process in the negative electrode manufacturing process.

Such a binder may be included in an amount of 10% by weight to 30% by weight with respect to the total weight of the negative electrode mixture.

In addition, the solvent capable of being used in the preparation of the negative electrode mixture may include a solvent generally used in the art, and may include dimethyl sulfoxide (DMSO), isopropyl alcohol, N-methylpyrrolidone (NMP), acetone, water or the like, and these may be used either alone as one type, or as a mixture of two or more types. The solvent may be included in an amount allowing suitable viscosity, considering applicability and processibility of the negative electrode mixture.

Furthermore, the negative electrode mixture may further include a viscosity agent together with the above-mentioned components. Specifically, the viscosity agent may be a cellulose-based compound such as carboxymethylcellulose (CMC). The viscosity agent may be included in the negative electrode mixture in an amount of 1% by weight to 10% by weight with respect to the total weight of the negative electrode mixture.

The negative electrode mixture having such a constitution may be applied on one surface of the negative electrode collector using common slurry coating methods. Examples of the slurry coating method may include bar coating, spin coating, roll coating, slot die coating, spray coating or the like, and one type of the methods may be used, or two or more types of the methods may be combined and used.

In addition, when the negative electrode mixture is applied, applying the negative electrode mixture to a proper thickness is preferable considering a loaded amount and a thickness of the active material in the finally prepared negative electrode active material layer.

After that, a drying process is carried out for the coated film of the negative electrode mixture formed on the negative electrode collector. Herein, the drying process may be carried out using a method such as heating treatment and hot air injection at a temperature capable of removing moisture included in the negative electrode as much as possible while evaporating the solvent in the negative electrode mixture, and at the same time, capable of increasing binding strength of the binder. Specifically, the drying process may be carried out at a temperature higher than or equal to a boiling point of the solvent and a temperature lower than or equal to a melting point of the binder, and more specifically, may be carried out at 100° C. to 150° C. More specifically, the drying process may be carried out at a temperature of 100° C. to 120° C. and under a pressure of 10 torr or less for 1 hour to 50 hours.

In addition, a rolling process after the drying process may be carried out using common methods.

As another method, the negative electrode active material layer may also be prepared by applying the negative electrode mixture on a separate support and drying the result to prepare a film state, and peeling off the formed film from the support, and laminating and rolling the result on a negative electrode collector.

Herein, the negative electrode mixture, the negative electrode collector, the application, the drying and the rolling processes are the same as those described above.

Meanwhile, when the electrode is a positive electrode, the positive electrode includes a positive electrode collector, and a positive electrode active material layer formed on the positive electrode collector and including a positive electrode active material.

Herein, the positive electrode collector is not particularly limited as long as it has conductivity without inducing chemical changes in a battery, and examples thereof may include stainless steel, aluminum, nickel, titanium, baked carbon, or aluminum or stainless steel of which surface is treated with carbon, nickel, titanium, silver or the like.

In addition, the positive electrode collector may have a thickness of 3 μm to 500 μm, or may form a fine unevenness on the positive electrode collector surface so as to increase adhesion of the positive electrode active material. For example, various forms such as films, sheets, foil, nets, porous materials, foams and non-woven fabrics may be used.

In the positive electrode active material layer, the positive electrode active material may use a compound capable of reversible intercalation and deintercalation of lithium (lithiated intercalation compound). Specifically, the compound may be a lithium transition metal oxide.

Specific examples of the lithium transition metal oxide may include a lithium-manganese-based oxide (for example, $LiMnO_2$, $LiMn_2O$ and the like), a lithium-cobalt-based oxide (for example, $LiCoO_2$ and the like), a lithium-nickel-based oxide (for example, $LiNiO_2$ and the like), a lithium-nickel-manganese-based oxide (for example, $LiNi_{1-Y}Mn_YO_2$ (herein, $0<Y<1$), $LiMn_{2-Z}Ni_ZO_4$ (herein, $0<Z<2$) and the like), a lithium-nickel-cobalt-based oxide (for example, $LiNi_{1-Y}Co_YO_2$ (herein, $0<Y<1$) and the like), a lithium-manganese-cobalt-based oxide (for example, $LiCo_{1-Y}Mn_YO_2$ (herein, $0<Y<1$), $LiMn_{2-Z}Co_ZO_4$ (herein, $0<Z<2$) and the like), a lithium-nickel-manganese-cobalt-based oxide (for example, $Li(Ni_PCo_QMn_R)O_2$ (herein, $0<P<1$, $0<Q<1$, $0<R<1$, $P+Q+R=1$) or $Li(Ni_PCo_QMn_R)O_4$ (herein, $0<P<2$, $0<Q<2$, $0<R<2$, $P+Q+R=2$) and the like), or a lithium-nickel-cobalt-metal (M) oxide (for example, $Li(Ni_PCo_QMn_RM_S)O_2$ (herein, M is selected from the group consisting of Al, Fe, V, Cr, Ti, Ta, Mg and Mo, and P, Q, R and S are each independently an atomic fraction of atoms with $0<P<1$, $0<Q<1$, $0<R<1$, $0<S<1$ and $P+Q+R+S=1$) and the like), and the like.

In addition, the lithium transition metal oxide may be doped with tungsten (W) and the like.

Among these, the positive electrode active material is preferably selected from the group consisting of $LiCoO_2$, $LiMnO_2$, $LiMn_2O_4$, $LiNiO_2$, a lithium-nickel-manganese-cobalt-based oxide (for example, $Li(Ni_{0.6}Mn_{0.2}Co_{0.2})O_2$, $LiNi_{0.5}Mn_{0.3}Co_{0.2}O_2$, $LiNi_{0.8}Mn_{0.1}Co_{0.1}O_2$ or the like), or a lithium-nickel-cobalt-aluminum oxide (for example, $LiNi_{0.8}Co_{0.15}Al_{0.05}O_2$ or the like), and mixtures thereof, in terms of enhancing a capacity property and stability of a battery.

Such a positive electrode may be manufactured using common methods for manufacturing a positive electrode. Specifically, the positive electrode may be manufactured by applying a positive electrode mixture prepared by dissolving a conductor and a binder together with the positive electrode active material on a positive electrode collector, and drying and rolling the result. In addition, the binder and the conductor included in the active material layer of the positive electrode are the same as those described above in the negative electrode.

In addition, a solvent generally used in the art may be used as the solvent, and examples thereof may include dimethyl sulfoxide (DMSO), isopropyl alcohol, N-methylpyrrolidone (NMP), acetone, water or the like, and these may be used either alone as one type, or as a mixture of two or more types. The solvent may be included in an amount allowing suitable viscosity, considering applicability and processibility of the positive electrode mixture.

The application, the drying and the rolling processes of the positive electrode mixture for the positive electrode collector may be carried out in the same manner as in the methods for manufacturing the negative electrode described above.

In addition, the positive electrode may also be manufactured by applying the positive electrode mixture on a separate support, and drying the result to prepare a film for forming a positive electrode active material layer, peeling off the film from the support, and laminating the result on a positive electrode collector.

Another embodiment of the present invention provides an electrochemical device including the positive electrode. The electrochemical device may be specifically a battery or a capacitor, and more specifically a lithium secondary battery.

The lithium secondary battery specifically includes a positive electrode, a negative electrode located opposite to the positive electrode, a separator provided between the positive electrode and the negative electrode, and an electrolyte, and at least one of the positive electrode and the negative electrode may be an electrode including the conductor as described above. Furthermore, the lithium secondary battery may selectively further include a battery container storing an electrode assembly of the positive electrode, the negative electrode and the separator, and a sealing member sealing the battery container.

In the lithium secondary battery, the separator is not particularly limited as long as it is commonly used as a separator of a lithium secondary battery, and particularly, a separator having low resistance for electrolyte ion migration and having excellent electrolyte liquid moisture containing ability is preferable. Specifically, a porous polymer film, for example, a porous polymer film prepared with a polyolefin-based polymer such as an ethylene homopolymer, a propylene homopolymer, an ethylene/butene copolymer, an ethylene/hexene copolymer and an ethylene/methacrylate copolymer, or a laminate structure of two or more layers of these may be used. In addition, common porous non-woven fabrics, for example, non-woven fabrics made of high melting point glass fiber or polyethylene terephthalate fiber may be used.

In addition, the electrolyte may include an organic solvent and a lithium salt commonly used in an electrolyte, and is not particularly limited.

The organic solvent may be used without particular limit as long as it is capable of performing a role of a medium through which ions involved in an electrochemical reaction of a battery are capable of migrating. Specific examples of the organic solvent may include ester-based solvents such as methyl acetate, ethyl acetate, γ-butyrolactone or ε-caprolactone; ether-based solvents such as dibutyl ether or tetrahydrofuran; ketone-based solvents such as cyclohexanone; aromatic hydrocarbon-based solvents such as benzene or fluorobenzene; carbonate-based solvents such as dimethyl carbonate (DMC), diethyl carbonate (DEC), methylethyl carbonate (MEC), ethylmethyl carbonate (EMC), ethylene carbonate (EC) or propylene carbonate (PC), and the like.

Among these, a carbonate-based solvent is preferable, and a mixture of cyclic carbonate (for example, ethylene carbonate, propylene carbonate or the like) having high ion conductivity and a high dielectric constant capable of enhancing charge and discharge performance of a battery, and a low viscous linear carbonate-based compound (for example, ethylmethyl carbonate, dimethyl carbonate, diethyl carbonate or the like) is more preferable.

In addition, the lithium salt may be used without particular limit as long as it is a compound capable of providing lithium ions used in a lithium secondary battery. Specific examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. $LiCl$, $LiI$, $LiB(C_2O_4)_2$ or the like. The lithium salt is preferably included in the electrolyte in a concentration of approximately 0.6 mol % to 2 mol %.

In the electrolyte, one or more types of additives including, for example, pyridine, triethylphosphite, triethanolamine, cyclic ether, ethylenediamine, n-glyme, hexaphosphate triamide, nitrobenzene derivatives, sulfur, quinone imine dye, N-substituted oxazolidinone, N,N-substituted imidazolidine, ethylene glycol dialkyl ether, ammonium salts, pyrrole, 2-methoxyethanol or aluminum trichloride may be further included in addition to the electrolyte forming components, with purposes of enhancing a battery lifespan property, suppressing battery capacity decline, enhancing battery discharge capacity and the like. Herein, the additive may be included in 0.1% by weight to 5% by weight with respect to the total weight of the electrolyte.

A lithium secondary battery having such constitution may be manufactured by preparing an electrode assembly by providing a separator between a positive electrode and a negative electrode, placing the electrode assembly inside a case, and then injecting an electrolyte liquid into the case.

An appearance of the lithium secondary battery is not particularly limited, but may include a cylinder-type, a square-type, a pouch-type or a coin-type using a can.

A lithium secondary battery including the conductor manufactured according to the manufacturing method of the present invention as above stably exhibits excellent discharge capacity, output property and capacity retention rate, and therefore, is used in the field of mobile devices such as mobile phones, laptop computers and digital cameras, and the field of electric vehicles such as hybrid electric vehicles, and the like.

Another embodiment of the present invention provides a battery module including the lithium secondary battery as a unit cell, and a battery pack including the same.

The battery module or the battery pack may be used as a power supply of medium to large size devices of any one or more of power tools; electric vehicles including electric vehicles (EV), hybrid electric vehicles and plug-in hybrid electric vehicles (PHEV); or systems for power storage.

Hereinafter, the present invention will be described in detail with reference to examples for those skilled in the art to readily carry out the invention. However, the present invention may be carried out in various different forms and is not limited to the examples described below.

Preparation Example 1: Manufacture of Conductor

A conductor was prepared by introducing 10 g of super P™ (Timcal) in a microwave generator having a frequency of 2.45 kHz and an output of 400 W, and irradiating microwave for 20 seconds while continuously injecting air from one side of the microwave generator. Herein, the temperature within the microwave generator was 500° C.

Preparation Example 2: Manufacture of Conductor

A conductor was manufactured in the same manner as in Preparation Example 1 except that microwave having a frequency of 2.45 kHz and an output of 400 W was irradiated for 10 seconds. Herein, the temperature within the microwave generator was 350° C.

Examples 1 and 2: Manufacture of Electrode for Lithium Secondary Battery and Lithium Secondary Battery An electrode for a lithium secondary battery, and a lithium secondary battery including the electrode were manufactured using each of the conductors manufactured in Preparation Examples 1 and 2.

In detail, a positive electrode mixture (viscosity: 5000 mPa·s) was prepared by mixing a $Li(Ni_{0.6}Mn_{0.2}Co_{0.2})O_2$ positive electrode active material, the conductor manufactured in Preparation Example 1 or 2, and a PVdF binder in a weight ratio of 90:5:5, respectively, in an N-methylpyrrolidone (NMP) solvent, and the mixture was applied on an aluminum collector, and the result was dried and rolled to manufacture a positive electrode.

Meanwhile, 96 g of artificial graphite, 2 g of carboxymethylcellulose and 2 g of styrene-butadiene rubber were mixed in NMP to prepare a negative electrode mixture. This negative electrode mixture was coated on Cu foil, the result was dried at 150° C. by heat treatment, and then rolled to manufacture a negative electrode.

An electrode assembly was prepared by placing a porous polyethylene separator between the positive electrode and the negative electrode prepared above, the electrode assembly was placed inside a case, and then an electrolyte liquid was injected into the case to manufacture a lithium secondary battery. Herein, the electrolyte liquid was prepared by dissolving 1.15 M lithium hexafluorophosphate ($LiPF_6$) in an organic solvent formed with ethylene carbonate (EC)/dimethyl carbonate (DMC)/ethylmethyl carbonate (EMC) (mixing volume ratio of EC/DMC/EMC=3/4/3).

Comparative Example 1: Manufacture of Electrode for Lithium Secondary Battery and Lithium Secondary Battery A positive electrode for a lithium secondary battery, and a lithium secondary battery including the electrode were manufactured in the same manner as in Example 1 except that super P™ (Timcal) was used as the conductor.

Test Example 1: Thermogravimetry (TG) Analysis on Conductor

Thermogravimetric analysis is a method measuring and analyzing weight changes of a sample by temperature variation when heating the sample under a given temperature condition.

In Test Example 1, thermogravimetric analysis and DTA/DSC were carried out at the same time using a Seiko SSC 5200 TG/DTA. Temperature calibration was carried out using nickel and ALUMEL™. Super P™, iron (Fe) powder, copper (Cu) powder and iron sulfide (FeS) powder prior to baking were each placed in an aluminum or platinum pan.

This pan was completely sealed with a lid, and this lid was opened using a drilling method immediately before inserting the pan into a TG furnace. The furnace was heated under air at a rate of 10° C./minute up to a final temperature of 1000° C. The results are shown in FIG. 1 to FIG. 4.

Figure 1:
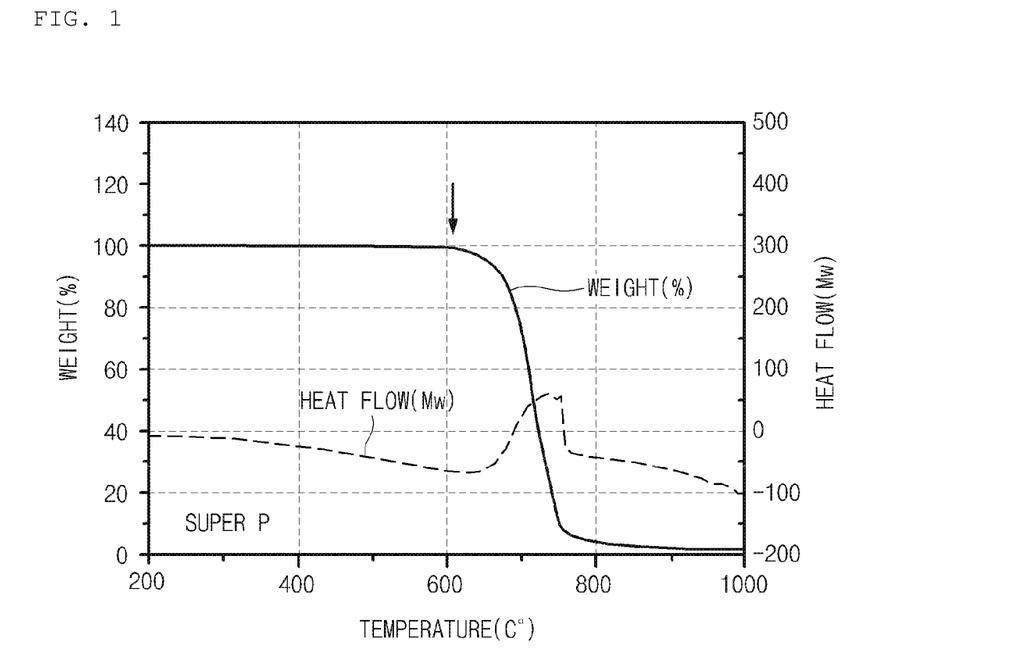
FIG. 1 is a graph showing a thermogravimetric analysis result on super P™ including metal impurities prior to microwave irradiation in Test Example 1.

Specifically, FIG. 1 is a thermogravimetric analysis result on super P™ prior to microwave treatment. In FIG. 1, the dotted line represents heat flow of the super P™, and the straight line represents thermogravimetric changes in the super P™. In the super P™ prior to microwave treatment, it was seen that the weight rapidly decreased after around 600° C. after microwave treatment. This is due to the fact that, in the super P™, the weight of the super P™ decreased since some of the super P™ was released as $CO_2$ gas around 600° C.

Figure 2:
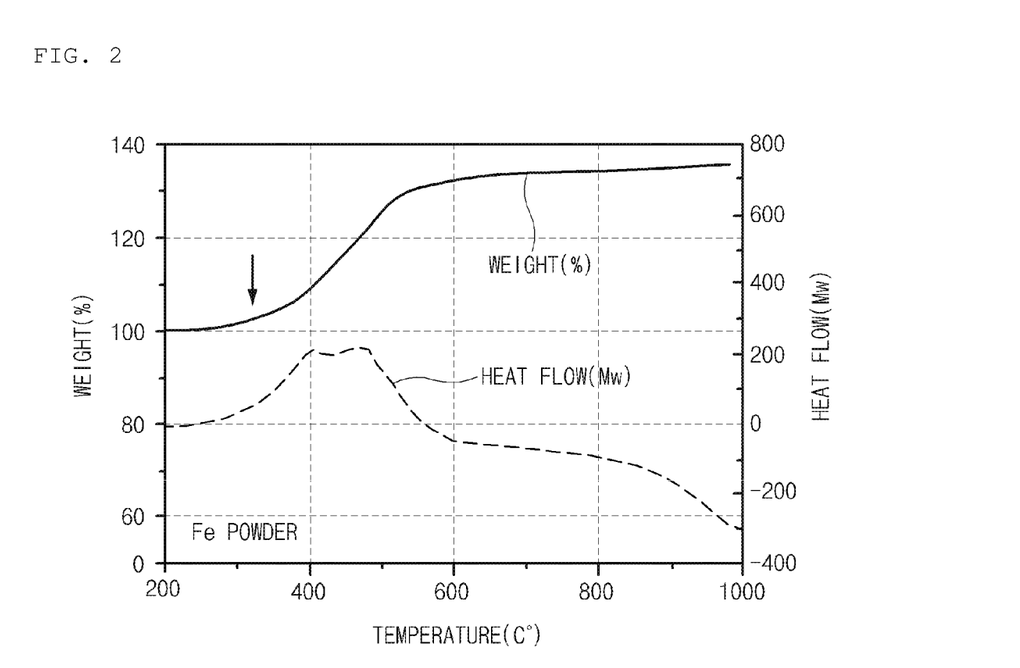
FIG. 2 is a graph showing a thermogravimetric analysis result on Fe powder included in super P™ prior to microwave irradiation in Test Example 1.
Figure 3:
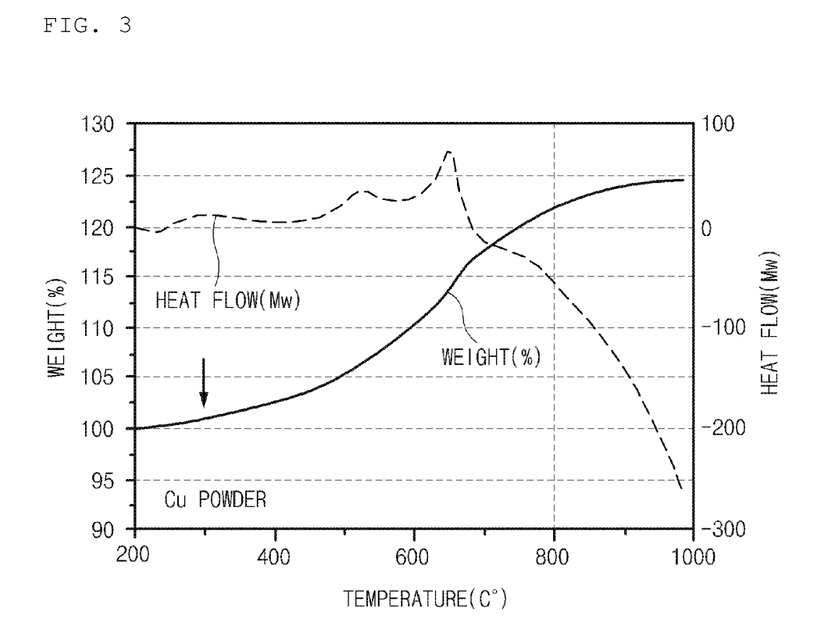
FIG. 3 is a graph showing a thermogravimetric analysis result on Cu powder included in super P™ prior to microwave irradiation in Test Example 1.
Figure 4:
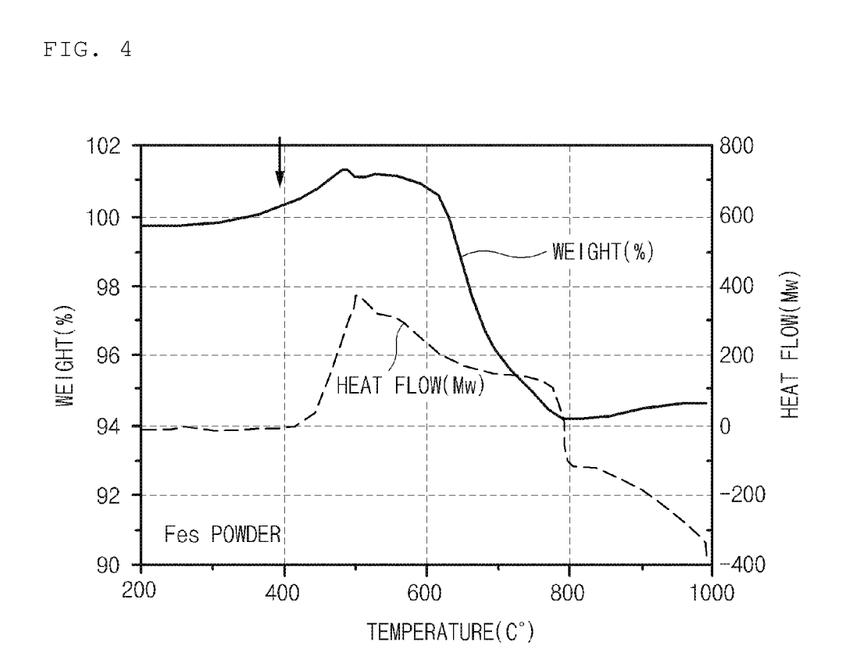
FIG. 4 is a graph showing a thermogravimetric analysis result on FeS powder included in super P™ prior to microwave irradiation in Test Example 1.

FIG. 2 to FIG. 4 are respective thermogravimetric analysis results on Fe powder, Cu powder and FeS powder, metal impurities included in the super P™. As seen in FIG. 2, an oxidation reaction started around 300° C. and the weight increased as the temperature increased. In addition, in the Cu powder of FIG. 3, an oxidation reaction started around 300° C., and in the FeS powder of FIG. 4, an oxidation reaction started around 400° C., and the weights increased as the temperatures increased.

Test Example 2: X-Ray Diffraction Analysis on Conductor

After irradiating microwave on Fe, FeS, Cu and Zn, metal impurities that may be included in the super P™, and heating the result at 500° C., X-ray diffraction analysis results on Fe, FeS, Cu and Zn prior to microwave irradiation, and on products after microwave treatment were shown in FIG. 5 to FIG. 8, respectively.

As the measurement condition of the X-ray diffraction analyzer, an applied voltage was 40 kV, an applied current was 40 mA and a measured 2θ (theta) range was from 10° to 90°, and measurements were carried out scanning at intervals of 0.05°. Herein, a variable divergence slit of mm was used as a slit, a large-sized poly(methyl methacrylate) (PMMA) holder (diameter=20 mm) was used in order to remove a background noise caused by the holder.

Figure 5:
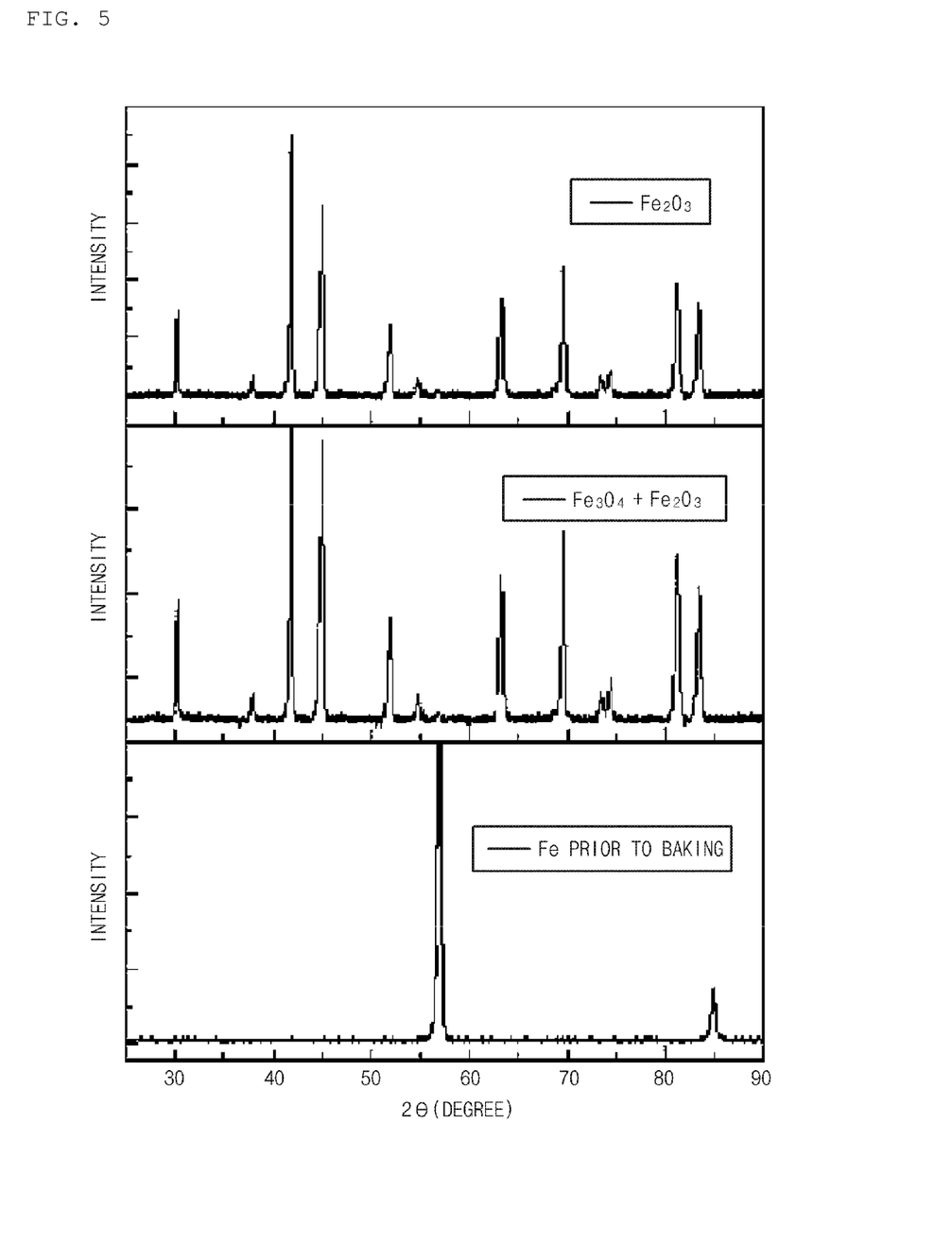
FIG. 5 is a graph showing X-ray diffraction analysis results on Fe powder included in super P™ prior to and after microwave irradiation in Test Example 2.

FIG. 5 is an X-ray diffraction analysis result on Fe, metal impurities that may be included in the super P™ prior to microwave irradiation, and on a product obtained by irradiating microwave on the Fe under the same condition as in Preparation Example 1.

From the graph (c) measured on Fe using an X-ray diffraction analyzer, a main peak was produced at approximately 2θ=57 degrees as seen in FIG. 5. However, in the conductor produced after microwave irradiation, it was seen that Fe oxides were produced (refer to FIG. 5 (a) and (b)). In other words, in the conductor produced after microwave irradiation, it was identified that the peak at approximately 57 degrees disappeared, and from the analysis result, it was seen that a mixed metal oxide of $Fe_3O_4$ and $Fe_2O_3$ (b), and $Fe_2O_3$ (a) were produced after baking. It indicates that Fe included in the conductor as metal impurities was converted to Fe oxides by microwave irradiation.

Figure 6:
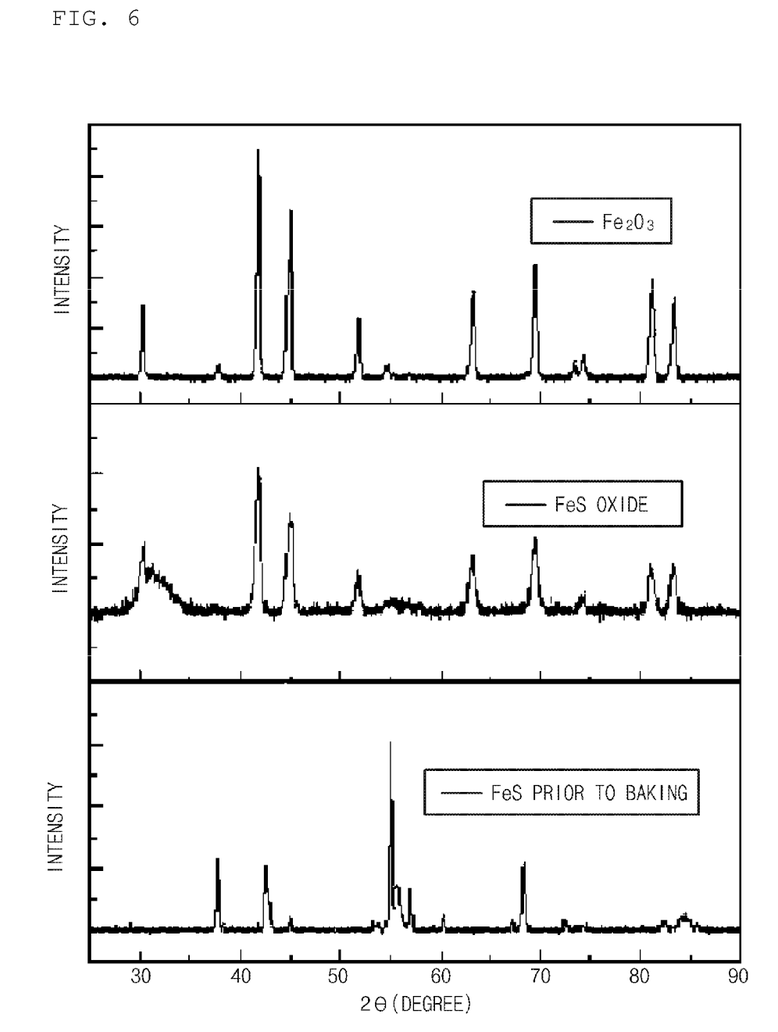
FIG. 6 is a graph showing X-ray diffraction analysis results on FeS powder included in super P™ prior to and after microwave irradiation in Test Example 2.

In addition, FIG. 6 is an X-ray diffraction analysis result on FeS, metal impurities that may be included in the super P™ prior to baking, and on a product produced by baking the FeS at approximately 500° C.

From the graph (c) measured for FeS using an X-ray diffraction analyzer, a main peak was produced at approximately 2θ=54 degrees as seen in FIG. 6. However, in the product produced after microwave irradiation, it was seen that a FeS oxide was produced (refer to FIG. 6 (a) and (b)). In other words, in the product produced after microwave irradiation, it was identified that the peak at approximately 54 degrees disappeared, and from the analysis result, it was seen that a FeS oxide (b) and $Fe_2O_3$ (a) were produced after baking. It indicates that FeS was converted to a FeS oxide and an iron oxide by microwave irradiation.

Figure 7:
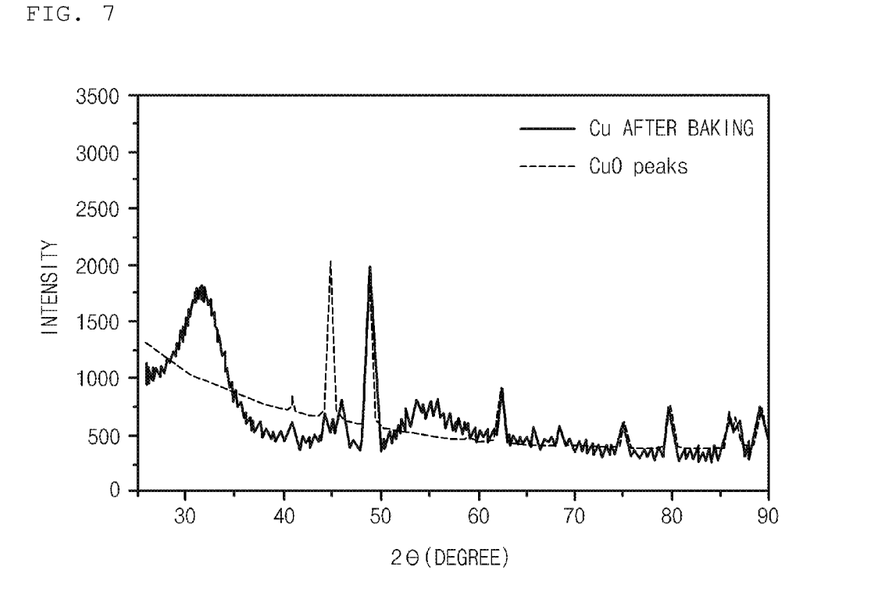
FIG. 7 is a graph showing X-ray diffraction analysis results on Cu powder included in super P™ prior to and after microwave irradiation in Test Example 2.
Figure 8:
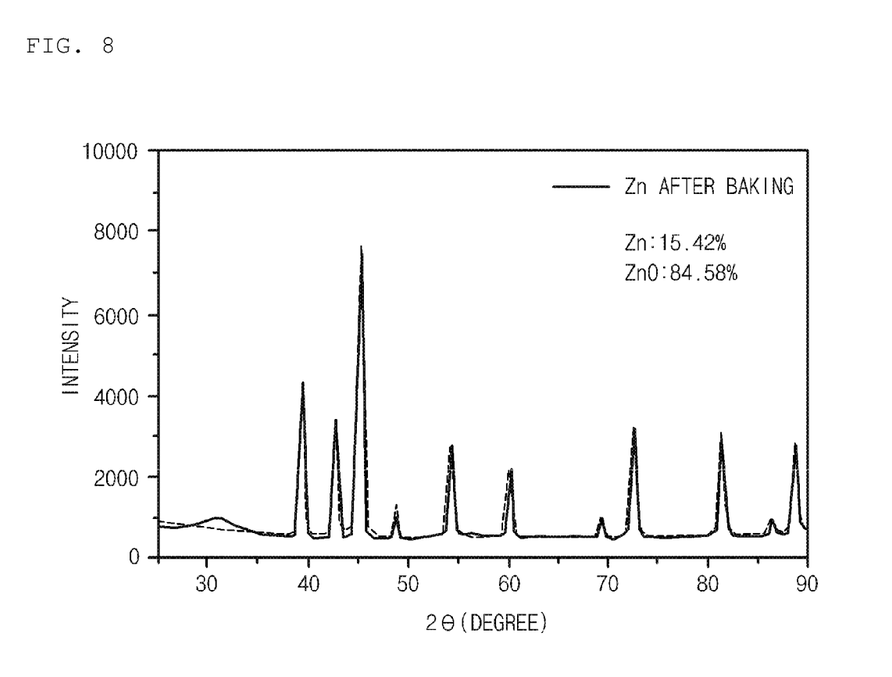
FIG. 8 is a graph showing X-ray diffraction analysis results on Zn powder included in super P™ prior to and after microwave irradiation in Test Example 2.

Meanwhile, FIG. 7 and FIG. 8 compare X-ray diffraction analysis results prior to and after baking, after baking Cu and Zn, metal impurities that may be included in the super P™ prior to baking, at 500° C.

When examining FIG. 7 and FIG. 8, it was identified that, when microwave was irradiated on Cu and Zn, main peaks of the Cu and the Zn disappeared, and peaks of CuO and ZnO were each produced. Accordingly, it was identified that each metal impurity was completely oxidized to produce metal oxides when microwave was irradiated.

In addition, a content ratio of the metal impurities/metal oxides may be measured considering the main peak of each metal impurity, and relative peak strength of the conductor produced at the peak after microwave treatment in the X-ray diffraction analyses of FIG. 5 to FIG. 8. Content ratios of the metal impurities/metal oxides that may be deduced from the X-ray diffraction analyses of FIG. 5 to FIG. 8 are shown in the following Table 1.

TABLE 1

|  | Fe/Fe Oxide (Weight Ratio) | FeS/FeS Oxide (Weight Ratio) | Cu/Cu Oxide (Weight Ratio) | Zn/Zn Oxide (Weight Ratio) |
|---|---|---|---|---|
| Fe | 0.2/99.8 = 0.002 | — | — | — |
| FeS | — | 0/100 = 0 | — | — |
| Cu | — | — | 0/100 = 0 | — |
| Zn | — | — | — | 15.42/84.58 = 0.182 |

As shown in Table 1, the content ratios of the metal impurities/metal oxides were in the range of 0 to 0.182 in a weight ratio, and it can be seen that metal impurities mostly converted to metal oxides.

Test Example 3: Oxidation and Reduction Potential Measurement on Fe Compound

Figure 9:
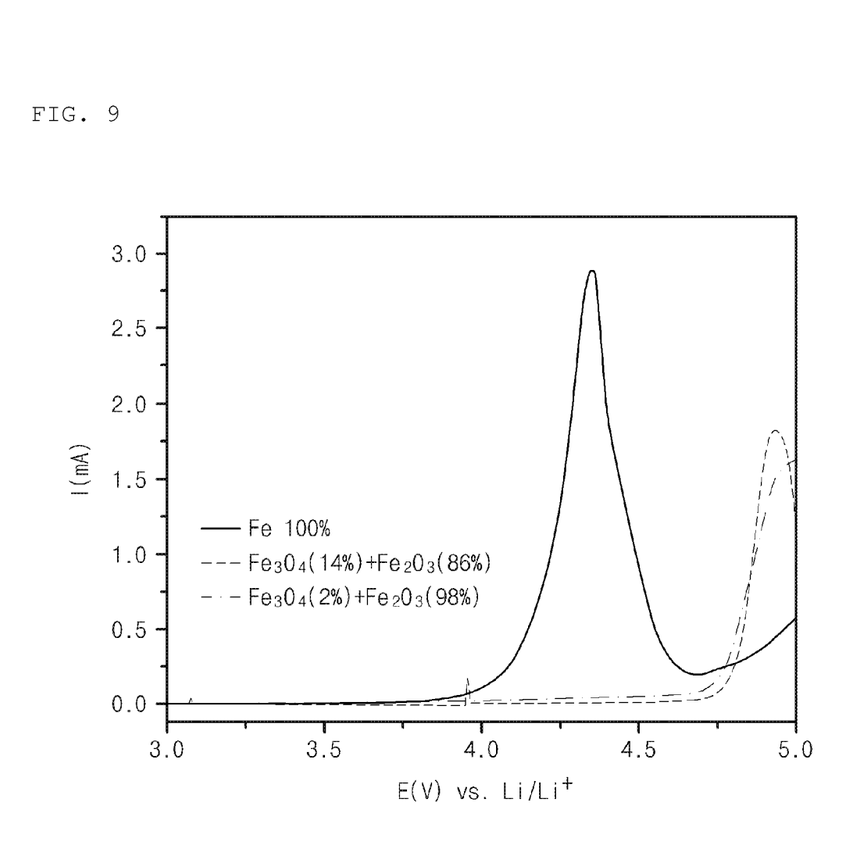
FIG. 9 is a graph showing oxidation potential measurement results on Fe metal and Fe oxides in Test Example 3.

In order to evaluate stability upon the oxide formation of metal impurities in the conductor manufactured in Preparation Examples 1 and 2, each oxidation and reduction potential was measured for metal iron (Fe) and iron oxides mixed in various compositions using a cyclic voltammetry method, and stability was evaluated. The results are each shown in FIG. 9 and the following Table 2.

<Condition of Oxidation and Reduction Potential Measurement>

Scan Rate: 1 mV/sec

Sweep Voltammetry: OCP/5 V/2.5 V

TABLE 2

| Sample | Composition | Oxidation Potential (vs. Li/Li+) |
|---|---|---|
| 1 | Fe 100% by weight | Approximately 4.3 V |
| 2 | $Fe_3O_4$ 14% by weight + $Fe_2O_3$ 86% by weight | N/A |

TABLE 2-continued

| Sample | Composition | Oxidation Potential (vs. Li/Li+) |
|---|---|---|
| 3 | Fe$_3$O$_4$ 2% by weight + Fe$_2$O$_3$ 98% by weight | N/A |

(In Table 2, N/A means not measurable)

Based on the test results, Fe oxides were stable under 3 V to 4.5 V, a battery operating range, while metal Fe, main impurities of the conductor, reacted at 4.3 V. From such results, it was seen that, when the conductor was irradiated with microwave, the conductor was stabilized under 3 V to 4.5 V, a battery operating range, by converting Fe, the metal impurities, to metal oxides. As a result, it was seen that metal impurities were not eluted in a battery operating voltage range, and consequently, low voltage defects were capable of being prevented.

Test Example 4: Evaluation on Electrode Properties of Lithium Secondary Battery

For the lithium secondary batteries manufactured in Examples 1 and 2 and Comparative Example 1, the battery properties were evaluated.

In detail, the lithium secondary batteries of Examples 1 and 2 and Comparative Example 1 were charged up to 4.2 V/38 mA with 1 C under a constant current/constant voltage (CC/CV) condition at 25° C., and then discharged down to 3.03 V with 2 C under a constant current (CC) condition. With this as one cycle, the tests were repeated for 1200 cycles. Discharge capacity, charge capacity and a capacity retention rate at the 1,200$^{th}$ cycle in the charge and discharge process were each measured.

TABLE 3

| | Discharge Capacity (mAh/g) | Capacity Charge (mAh/g) | Capacity Retention Rate (%) |
|---|---|---|---|
| Example 1 | 174.6 | 179.3 | 97.4 |
| Example 2 | 175.3 | 179.6 | 97.6 |
| Comparative Example 1 | 169.3 | 178.0 | 95.1 |

As seen from Table 3, in the lithium secondary batteries of Examples 1 and 2 including a conductor treated with microwave, metal impurities included in the conductor were converted to metal oxides by microwave treatment, and therefore, charge and discharge capacity were high, and a capacity retention rate increased by an average of approximately 2.4% compared to the lithium secondary battery of Comparative Example 1 including a conductor that was not treated with microwave.

What is claimed is:

1. A method for manufacturing a conductor comprising:
    removing a metal impurity in the conductor via microwave irradiation of the conductor including the metal impurity and converting the metal impurity into an oxide of metal impurity,
    wherein the conductor is a carbon-based material, wherein the carbon-based material is carbon black, acetylene black, Ketjen black, channel black, furnace black, lamp black, thermal black, denca black, super P, super C, carbon fiber, a carbon nanotube or activated carbon, and
    wherein, after the microwave irradiation, the conductor includes the metal impurity and the oxide of the metal impurity in a weight ratio of 0:100 to 0.5:99.5.

2. The method of claim 1, wherein the microwave irradiation is carried out by irradiating microwave having a frequency of 1 kHz to 50 kHz and an output of 400 W to 2000 W for 20 seconds or less.

3. The method of claim 1, wherein the microwave irradiation is carried out under a condition of thermally oxidizing the conductor including the metal impurity at a temperature of 350° C. to 600° C.

4. The method of claim 1, wherein the metal impurity includes any one, two or more selected from the group consisting of a metal, an alloy or a sulfide thereof,
    wherein the metal is any one selected from the group consisting of iron, copper, zinc, calcium, titanium and chromium, and
    the alloy includes two or more elements selected from the group consisting of iron, copper, zinc, calcium, titanium and chromium.

5. The method of claim 1, wherein the metal impurity includes any one, two or more selected from the group consisting of iron, copper, zinc, calcium, titanium, chromium and an iron sulfide.

6. The method of claim 1, wherein the metal oxide is an oxide of the metal impurity including any one, two or more selected from the group consisting of a metal, an alloy and a sulfide thereof.

7. The method of claim 1, wherein the metal oxide includes any one, or a mixture of two or more selected from the group consisting of an iron oxide, an iron sulfide oxide, a copper oxide, a zinc oxide, a calcium oxide, a titanium oxide and a chromium oxide.

8. A conductor manufactured using the manufacturing method of claim 1.

9. The conductor of claim 8, wherein the oxide of the metal impurity is present in an amount of 0.01% by weight to 1% by weight with respect to a total weight of the conductor.

10. The conductor of claim 8, wherein the metal impurity includes any one, two or more selected from the group consisting of a metal, an alloy and a sulfide thereof,
    wherein the metal is any one selected from the group consisting of iron, copper, zinc, calcium, titanium and chromium, and
    the alloy includes two or more elements selected from the group consisting of iron, copper, zinc, calcium, titanium and chromium.

11. The conductor of claim 8, wherein the oxide of the metal impurity includes any one, or a mixture of two or more selected from the group consisting of an iron oxide, an iron sulfide oxide, a copper oxide, a zinc oxide, a calcium oxide, a titanium oxide and a chromium oxide.

12. An electrode for a lithium secondary battery comprising the conductor of claim 8.

13. A lithium secondary battery comprising:
    a positive electrode;
    a negative electrode;
    a separator provided between the positive electrode and the negative electrode; and
    a non-aqueous electrolyte,
    wherein at least one of the positive electrode or the negative electrode includes the conductor of claim 8.

14. A battery module comprising the lithium secondary battery of claim 13 as a unit cell.

15. A battery pack comprising the battery module of claim 14.

16. A device comprising the battery pack of claim 15 as a power source.

17. The device of claim 16, wherein the device is selected from the group consisting of an electric vehicle, a hybrid electric vehicle, a plug-in hybrid electric vehicle and a power storage system.

* * * * *